United States Patent
Kaneko et al.

[11] Patent Number: 5,876,627
[45] Date of Patent: Mar. 2, 1999

[54] DICHROIC DYE LIQUID CRYSTAL COMPOSITION CONTAINING THE DYE, AND LIQUID-CRYSTAL ELEMENT

[75] Inventors: Masaharu Kaneko; Tomio Yoneyama, both of Yokohama, Japan

[73] Assignee: Mitsubishi Chemical Corporation, Tokyo, Japan

[21] Appl. No.: 757,813

[22] Filed: Nov. 27, 1996

[30] Foreign Application Priority Data

Nov. 27, 1995 [JP] Japan .................................. 7-329433

[51] Int. Cl.6 .......................... C09K 19/32; C09K 19/00; C09K 19/34; C09K 19/12
[52] U.S. Cl. ................... 252/299.62; 252/299.1; 252/299.61; 252/299.66; 349/182
[58] Field of Search ................ 252/299.62, 299.66, 252/299.1

[56] References Cited

U.S. PATENT DOCUMENTS

| | | | |
|---|---|---|---|
| 4,402,854 | 9/1983 | Moeller et al. | 252/299.1 |
| 4,667,019 | 5/1987 | Etzbach et al. | 534/577 |
| 4,667,020 | 5/1987 | Etzbach et al. | 534/577 |
| 4,721,779 | 1/1988 | Etzbach et al. | 534/577 |
| 4,724,259 | 2/1988 | Etzbach et al. | 534/577 |
| 4,734,218 | 3/1988 | Takuma et al. | 252/299.61 |
| 4,737,310 | 4/1988 | Imazeki et al. | 252/299.1 |
| 5,104,572 | 4/1992 | Ozawa et al. | 252/299.1 |
| 5,453,217 | 9/1995 | Kaneko et al. | 252/299.1 |
| 5,536,818 | 7/1996 | Kaneko et al. | 534/577 |
| 5,589,100 | 12/1996 | Grasso et al. | 252/299.01 |

FOREIGN PATENT DOCUMENTS

| | | | |
|---|---|---|---|
| 58-84858 | 5/1983 | Japan | C09K 29/00 |
| 58-138767 | 8/1983 | Japan | C09K 3/34 |
| 59-22964 | 2/1984 | Japan | C09B 29/08 |
| 59-172580 | 9/1984 | Japan | C09K 3/34 |
| 0038296 | 10/1981 | United Kingdom . | |

*Primary Examiner*—C. H. Kelly
*Attorney, Agent, or Firm*—Sughrue, Mion, Zinn, Macpeak & Seas, PLLC

[57] ABSTRACT

A dichroic azo dye represented by general formula [I]

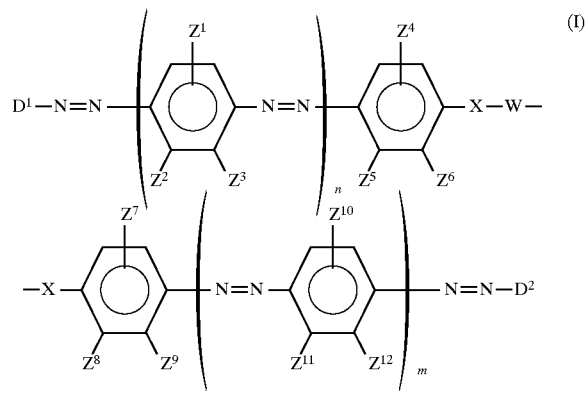

wherein $D^1$ and $D^2$ each represents an optionally substituted phenyl group or an aromatic heterocyclic group; W represents a connecting group comprising a linear polycyclic aromatic group; X represents a group selected from the group consisting of —$OCH_2$—, —$CH_2O$—, —OOC—, —COO—, —$CH_2NR$—, and —$NRCH_2$—, where R represents a hydrogen atom or a methyl group; $Z^1$ to $Z^{12}$ each represents a hydrogen atom, a halogen atom, a methyl group, or a methoxy group, or $Z^2$ and $Z^3$, $Z^5$ and $Z^6$, $Z^8$ and $Z^9$, and $Z^{11}$ and $Z^{12}$ are bonded to each other to form an aliphatic ring, an aromatic ring, or a nitrogen-containing aromatic ring; and m and n each represents a number of 0 to 2. A liquid-crystal composition containing the above dye and a liquid-crystal element employing the composition are also disclosed.

8 Claims, No Drawings

DICHROIC DYE LIQUID CRYSTAL COMPOSITION CONTAINING THE DYE, AND LIQUID-CRYSTAL ELEMENT

FIELD OF THE INVENTION

The present invention relates to a novel dichroic azo dye, a liquid-crystal composition containing the same, and a liquid-crystal element employing the composition.

BACKGROUND OF THE INVENTION

Besides the twisted nematic (TN) display mode and the super-twisted nematic (STN) display mode, various display modes for liquid-crystal display elements have been proposed so far. One of these is the guest-host (GH) display mode which employs a solution of a dye in a liquid crystal; this display mode is widely used in automotive display panels and other displays because of features thereof including a wide viewing angle.

Dichroic dyes for use in this GH mode are required to be excellent in dichroism, solubility, light resistance, and coloring power.

However, few dyes combine all those properties. In particular, although high dichroism is required for obtaining a high-contrast display, the dichroism of the prior art dyes is insufficient.

SUMMARY OF THE INVENTION

An object of the present invention is provide a dichroic dye having sufficiently high dichroism in order to eliminate the problem described above. Other objects of the present invention are to provide a liquid-crystal composition containing the dye, and to provide a liquid-crystal element employing the liquid-crystal composition.

As a result of intensive studies made by the present inventors in view of the above subjects, they have found that a dye comprising two azo compounds bonded to each other through a specific connecting group has exceedingly high dichroism. The present invention has been achieved based on this finding.

The present invention provides, in the first aspect thereof, a dichroic azo dye represented by general formula [I]:

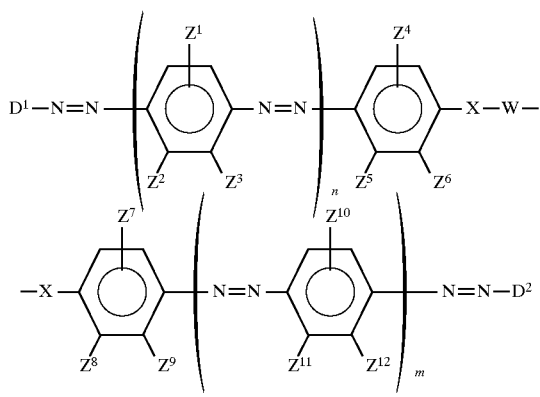

wherein $D^1$ and $D^2$ each represents an optionally substituted phenyl group or an aromatic heterocyclic group; W represents a connecting group comprising a linear polycyclic aromatic group; X represents a group selected from the group consisting of —OCH$_2$—, —CH$_2$O—, —OOC—, —COO—, —CH$_2$NR—, and —NRCH$_2$—, where R represents a hydrogen atom or a methyl group; $Z^1$ to $Z^{12}$ each represents a hydrogen atom, a halogen atom, a methyl group, or a methoxy group, or $Z^2$ and $Z^3$, $Z^5$ and $Z^6$, $Z^8$ and $Z^9$, and $Z^{11}$ and $Z^{12}$ are bonded to each other to form an aliphatic ring, an aromatic ring, or a nitrogen-containing aromatic ring; and m and n each represents a number of 0 to 2. According to the second aspect of the present invention, a liquid-crystal composition is provided which contains the above dichroic azo dye. According to the third aspect of the present invention, a liquid-crystal element is provided which employs the liquid-crystal composition.

DETAILED DESCRIPTION OF THE INVENTION

The dichroic azo dye of the present invention can be obtained, for example, by etherifying, esterifying, or alkylating one or both of two azo dyes obtained through a known diazotizing coupling reaction and respectively represented by general formulae [II] and [III]:

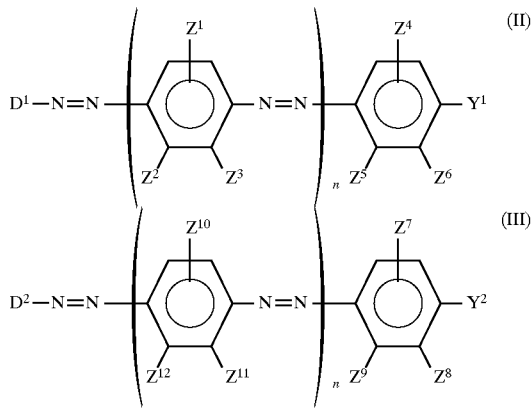

(wherein $y^1$ and $y^2$ each represents —OH, —COOH, or —NHR, where R represents a hydrogen atom or a methyl group; and $D^1$, $D^2$, $Z^1$ to $Z^{12}$, n, and m have the same meanings as in general formula [I]) with a compound represented by general formula [IV]:

$Y^3$—W—$Y^3$            [IV]

(wherein $Y^3$ represents —OH, —COOH, or —CH$_2Y^4$, where $Y^4$ represents a halogen atom; and W has the same meaning as in general formula [I]) by a known method.

Examples of substituents of $D^1$ and $D^2$ in general formula [I] include a hydrogen atom; halogen atoms such as fluorine, chlorine, and bromine; cyano; nitro; trifluoromethyl; trifluoromethoxy; dialkyl-substituted amino groups having 2 to 8 carbon atoms, such as dimethylamino and diethylamino; linear or branched alkyl groups having 1 to 10 carbon atoms, such as methyl, ethyl, propyl, butyl, pentyl, hexyl, octyl, and nonyl; linear or branched alkoxyalkyl groups having 2 to 10 carbon atoms, such as ethoxymethyl, butoxymethyl, ethoxyethyl, and butoxyethyl; linear or branched alkoxy groups having 1 to 10 carbon atoms such as methoxy, ethoxy, propoxy, butoxy, and heptyloxy; linear or branched alkoxycarbonyl groups having 2 to 10 carbon atoms, such as butoxycarbonyl and hexyloxycarbonyl; cyclohexyloxycarbonyl groups optionally substituted with at least one linear or branched alkyl group having 1 to 10 carbon atoms, such as propylcyclohexyloxycarbonyl and butylcyclohexyloxycarbonyl; and phenoxycarbonyl groups optionally substituted with at least one linear or branched alkyl group having 1 to 10 carbon atoms, such as propylphenoxycarbonyl and pentylphenoxycarbonyl.

Examples of the aromatic heterocyclic group include a thiazole ring, a benzothiazole ring, a thiadiazole ring, and a benzoxazole ring.

$Z^1$ to $Z^{12}$ each represents a hydrogen atom, a halogen atom, a methyl group, or a methoxy group, provided that $Z^2$ and $Z^1$, $Z^5$ and $Z^6$, $Z^8$ and $Z^9$, and $Z^{11}$ and $Z^{12}$ each may be bonded to each other to form an aliphatic ring, e.g., part of a tetralin ring, an aromatic ring, e.g., part of a naphthalene ring, or a nitrogen-containing aromatic ring, e.g., part of a quinoline ring. In the case where n and m each is 2, the phenylene groups having $Z^1$ to $Z^3$ or $Z^{10}$ to $Z^{12}$ may differ from each other in any of $Z^1$ to $Z^3$ or of $z^{10}$ to $Z^{12}$.

The "connecting group comprising a linear polycyclic aromatic group" represented by W means a connecting group which comprises at least two aromatic rings or aromatic heterocycles and which enables the dye of the present invention to have intact molecular linearity and does not cause the molecular axis to bend at the connecting group W. Those aromatic rings or aromatic heterocycles are bonded to each other through condensation or a single bond. Due to the connecting group W, having the specific structure, the dye can not only have a longer backbone as compared with, e.g., dyes having a phenylene connecting group, but also have intact linearity and moderate solubility.

Desirable examples of W include 4,4'-biphenylene, 2,6-naphthylene, 2,6-anthracylene, 2,7-phenanthrylene, and 4,4"-p-terphenylene. Preferred of these are 4,4'-biphenylene and 2,6-naphthylene.

W may have one or more substituents. Examples of the substituents include halogen atoms, a methyl group, a trifluoromethyl group, and a methoxy group.

Specific examples of the dichroic azo dye represented by general formula [I] include dyes Nos. 1 to 18 shown in Table 2 given later.

The dichroic dye of the present invention may be used in an amount of usually from 0.05 to 15% by weight, preferably from 0.5 to 5% by weight, based on the amount of a liquid-crystal compound.

Examples of the liquid-crystal compound for use in the present invention include the compounds shown in Table 1.

TABLE 1

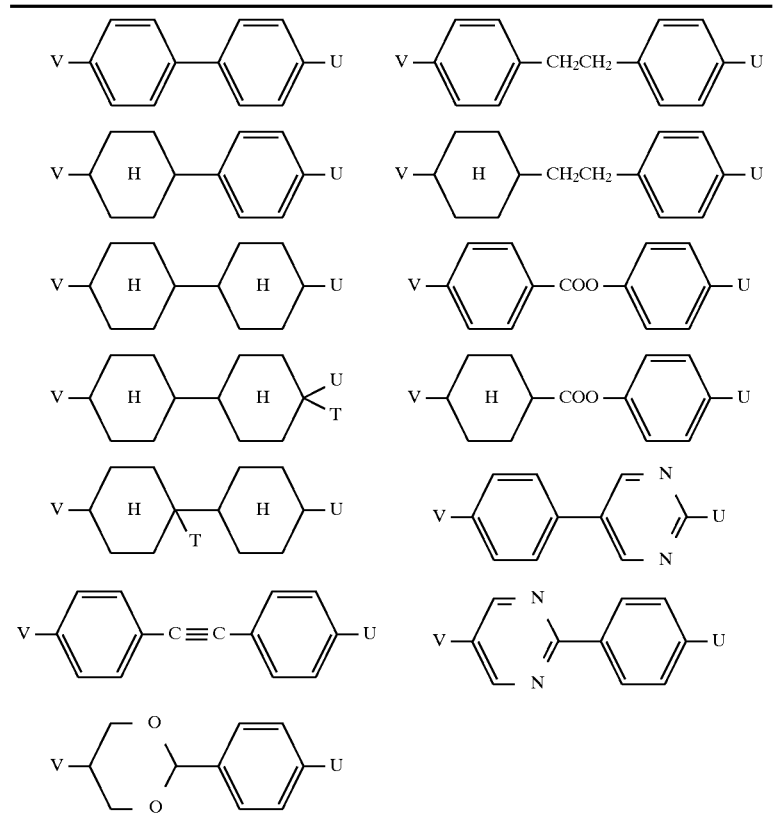

(In the formulae, V and U each represents an alkyl group, an alkoxy group, an alkoxyalkyl group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyphenylalkyl group, an alkylcyclohexylalkyl group, an alkoxyalkoxycyclohexylalkyl group, an alkoxyphenylalkyl group, or an alkylcyclohexylphenylalkyl group, wherein the alkyl chains and alkoxy chains each may have an optically active site therein; and T represents a hydrogen atom, a halogen atom, or a cyano group. The phenyl or phenoxy group which may be contained in V and U may be substituted with at least one substituent selected from a cyano group and halogen atoms, e.g., fluorine and chlorine. The phenyl groups contained in the above structural formulae each may be substituted with up to four substituents selected from halogen atoms, e.g., fluorine and chlorine, and a cyano group.)

Recently, fluorinated liquid-crystal compounds having one or more fluorine atoms or fluorinated groups, e.g., —F, —CF$_3$, and —OCF$_3$, are used in place of conventional cyano-containing liquid-crystal compounds in TFT LCDs (thin-film transistor liquid-crystal displays). The dichroic dye of the present invention is suitable for use with these fluorinated liquid-crystal compounds because of its good compatibility therefor, etc.

The liquid-crystal composition according to the second aspect of the present invention may contain an optically active compound such as, e.g., cholesteryl nonanoate. It may further contain various additives including ultraviolet absorbers and antioxidants.

When the thus-obtained liquid-crystal composition is sandwiched between electrode-possessing substrates at least one of which is transparent, an element utilizing a guest-host effect [see, for example, Shoich Matsumoto and Nagayoshi Sumida, *Ekishō No Saishin Gijutsu* (The Newest Liquid-Crystal Technology), Kōgyō Chōsakai, 34 (1983); and J. L. Fergason, *SID 85 Digest*, 68 (1983)] or the like can be constituted.

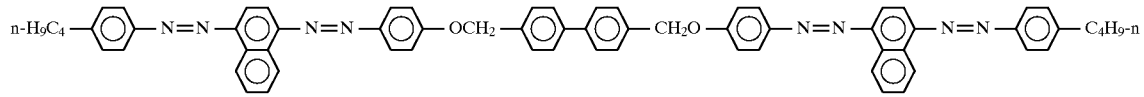

The transparent electrode is usually produced by forming a transparent electrode layer on a substrate which is either a glass plate or a plate of any of various synthetic resins including acrylic resins, polycarbonate resins, and epoxy resins. The transparent electrode layer is usually made of a metal oxide such as, e.g., indium oxide, indium-tin oxide (ITO), or tin oxide. That surface of the transparent electrode layer which is to be in contact with a liquid crystal may be subjected to an alignment treatment if desired. The alignment treatment can be accomplished, for example, by applying octadecyldimethyl[3-(trimethoxysilyl)propyl] ammonium chloride, hexadecyltrimethylammonium bromide, or the like for vertical alignment, by applying a polyimide for parallel alignment, by rubbing the surface with a cotton cloth, absorbent cotton, or the like for parallel alignment, or by vapor-depositing an SiO$_x$ at a small tilt angle for parallel alignment. These alignment techniques may be suitably used.

The base body of a display element is produced as follows. Two substrates each having a transparent electrode layer are united through a spacer or the like in such a manner that the electrode surfaces which have undergone an alignment treatment face each other at a distance of from 1 to 50 μm, preferably from 1 to 15 μm. The liquid-crystal composition is then packed into the space between the substrates, and the resulting structure is sealed to form the desired structure.

The present invention is. explained below in detail by reference to Examples.

The present invention should not be construed as being limited to these Examples, unless the invention departs from the spirit thereof.

EXAMPLE 1

Into 100 ml of N-methylpyrrolidone was dissolved 4.1 g of the disazo dye shown by the following structural formula.

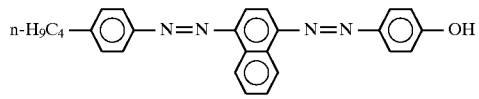

To the solution were added 2 g of potassium carbonate and 1.2 g of 4,4'-dichloromethylbiphenyl. This mixture was reacted at 80° C. for 5 hours, and then diluted with methanol. The resulting precipitate was taken out by filtration, and the crude crystals thus obtained were purified by column chromatography to obtain 2.6 g of the azo dye shown by the following structural formula.

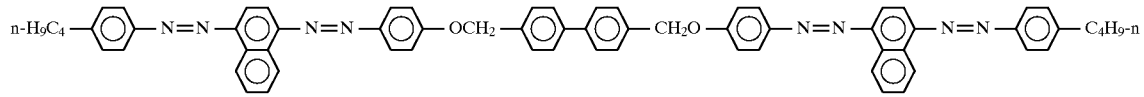

This azo compound was dissolved into the fluorinated liquid-crystal mixture commercially available under the trade name of ZLI-4792 (manufactured by E. MERCK Co.) in a concentration of 1% by weight to prepare a yellow guest-host liquid-crystal composition. This composition was packed into a cell having a gap width of 9 μm and comprising two glass substrates facing each other and each having a transparent electrode which had undergone a treatment for liquid-crystal parallel alignment comprising applying a polyimide resin, curing the same, and rubbing the cured resin. The cell was then sealed.

The yellow cell thus fabricated was examined for absorbance for linearly polarized light parallel to the alignment direction (A//) and absorbance for linearly polarized light perpendicular to the alignment direction (A⊥). The order parameter (S) at the absorption peak thereof ($\lambda_{max}$: 457 nm) was determined using the following equation.

$$S=(A//-A\perp)/(A//+2A\perp)$$

As a result, S was found to be 0.80.

EXAMPLE 2

Into 100 ml of N-methylpyrrolidone were dissolved 4.6 g of the disazo dye shown by the following structural formula

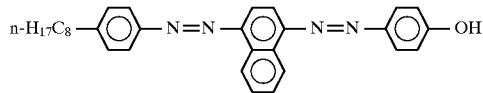

and 1.2 g of 2,6-naphthalenedicarbonyl chloride. To this solution was added 1.5 g of triethylamine. This mixture was reacted at 70° C. for 3 hours, and then diluted with methanol. The resulting precipitate was taken out by filtration, and the crude crystals thus obtained were purified by column chromatography to obtain 3.6 g of the azo dye shown by the following structural formula.

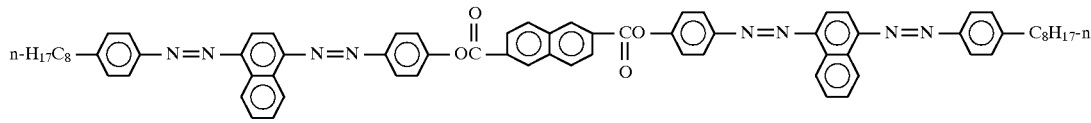

Using this azo dye, a yellow liquid-crystal cell was fabricated in the same manner as the above. This cell was examined for order parameter in the same manner as the above. As a result, S was found to be 0.81 ($\lambda_{max}$: 449 nm).

EXAMPLE 3

Into 100 ml of N-methylpyrrolidone was dissolved 3.1 g of the monoazo dye shown by the following structural formula.

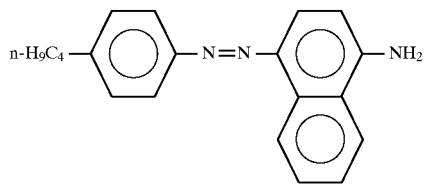

To this solution were added 2 g of potassium carbonate and 1.2 g of 4,4'-dichloromethylbiphenyl. This mixture was reacted at 80° C. for 9 hours, and then diluted with methanol. The resulting precipitate was taken out by filtration, and the crude crystals thus obtained were purified by column chromatography to obtain 0.8 g of the azo dye shown by the following structural formula.

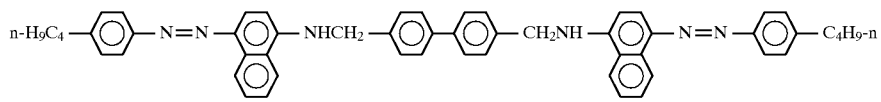

Using this azo dye, a yellow liquid-crystal cell was fabricated in the same manner as the above. This cell was examined for order parameter in the same manner as the above. As a result, S was found to be 0.78 ($\lambda_{max}$: 439 nm).

EXAMPLE 4

Various azo dyes were obtained according to the methods used in Examples 1 to 3. These azo dyes are shown in Table 2 together with their order parameters (S) in the fluorinated liquid-crystal mixture commercially available under the trade name of ZLI-4792 (manufactured by E. MERCK Co.) and their hues.

TABLE 2
| No | Structure | S Value | Hue |
|----|-----------|---------|-----|
| 1 | 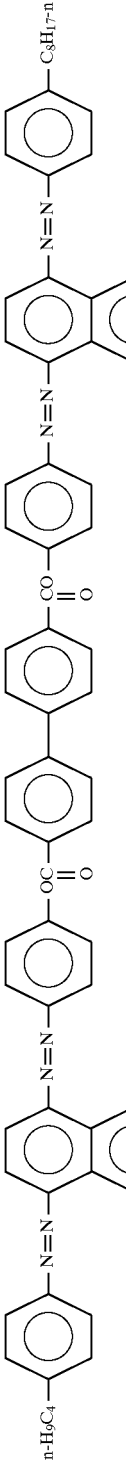 | 0.81 | yellow |
| 2 | 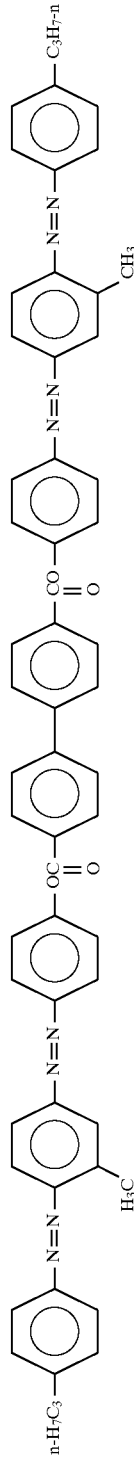 | 0.80 | yellow |
| 3 | 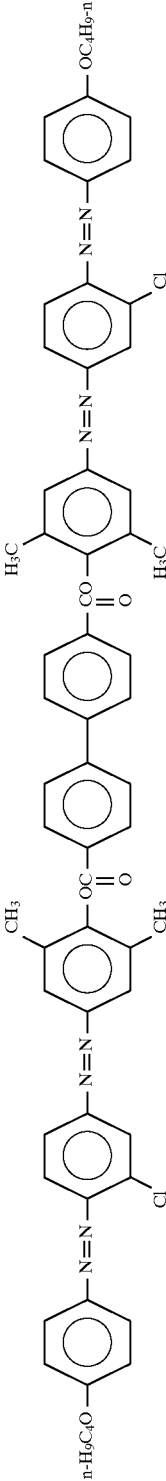 | 0.78 | yellow |
| 4 | 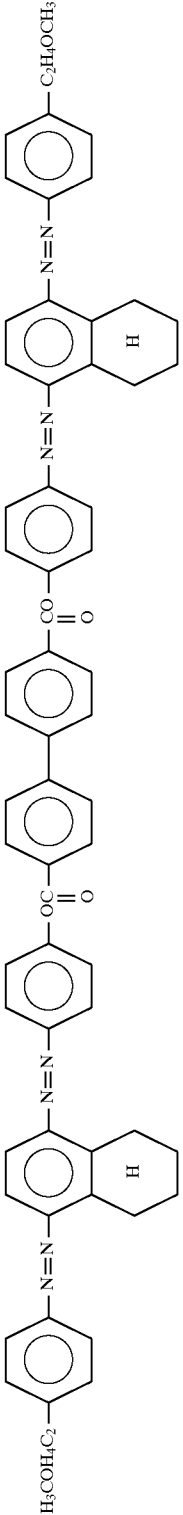 | 0.80 | yellow |
| 5 | 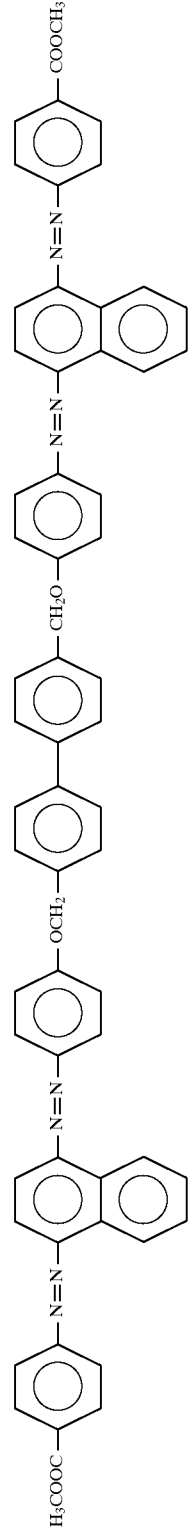 | 0.80 | yellow |

TABLE 2-continued

| No | Structure | S Value | Hue |
|---|---|---|---|
| 6 | (structure) | 0.79 | yellow |
| 7 | (structure) | 0.80 | yellowish orange |
| 8 | (structure) | 0.78 | bluish red |
| 9 | (structure) | 0.79 | yellow |
| 10 | (structure) | 0.81 | bluish red |

TABLE 2-continued

| No | Structure | S Value | Hue |
|----|-----------|---------|-----|
| 11 | | 0.80 | yellow |
| 12 | | 0.76 | purple |
| 13 | | 0.77 | orange |
| 14 | | 0.79 | red |
| 15 | | 0.78 | yellow |

TABLE 2-continued

| No | Structure | S Value | Hue |
|---|---|---|---|
| 16 | (bis-azo compound with 4-fluorophenyl end groups, naphthalene and phenyl-CH₂O linkers) | 0.80 | yellow |
| 17 | (bis-azo compound with 4-n-butylphenyl and 4-fluorophenyl end groups) | 0.80 | orange |
| 18 | (bis-azo compound with 4-methylphenyl ester end groups and naphthalene-CH₂NH linkers) | 0.79 | yellowish orange |

The dichroic dye of the present invention has high dichroism and high coloring power. The liquid-crystal composition obtained by mixing the dye with a liquid-crystal substance can be used for providing a display element excellent in contrast, etc.

While the invention has been described in detail and with reference to specific embodiments thereof, it will be apparent to one skilled in the art that various changes and modifications can be made therein without departing from the spirit and scope thereof.

What is claimed is:

1. A dichroic azo dye represented by general formula (I):

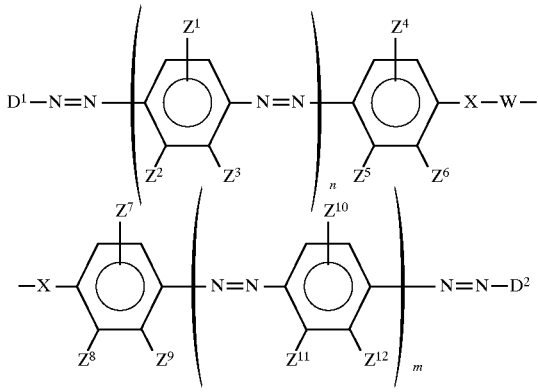

wherein $D^1$ and $D^2$ each represents an optionally substituted phenyl group or an aromatic heterocyclic group; W represents a connecting group comprising a linear polycyclic aromatic group selected from 4,4'-biphenylene, 2,6-naphthylene, 2,6-anthracylene, 2,7-phenanthrylene or 4,4''-p-terphenylene which each may have one or more substituents; X represents a group selected from the group consisting of —OCH$_2$—, —CH$_2$O—, —OOC—, —COO—, —CH$_2$NR—and —NRCH$_2$—, where R represents a hydrogen atom or a methyl group; $Z^1$ to $Z^{12}$ each represents a hydrogen atom, a halogen atom, a methyl group or a methoxy group, or $Z^2$ and $Z^3$, $Z^5$ and $Z^6$, $Z^8$ and $Z^9$ and $Z^{11}$ and $Z^{12}$ are bonded to each other to form an aliphatic ring or an aromatic ring; and m and n each represents a number of 0 to 2.

2. The dichroic azo dye as claimed in claim 1, wherein W is 4,4'-biphenylene or 2,6-naphthylene which each may have one or more substituents.

3. The dichroic azo dye as claimed in claim 1, wherein when $D^1$ or $D^2$ is said optionally substituted aromatic heterocyclic group, the aromatic heterocyclic group is a thiazole ring, benzothiazole ring, a thiadiazole ring or a benzoxazole ring.

4. A liquid-crystal composition comprising a liquid-crystal compound and a dichroic azo dye represented by general formula (I):

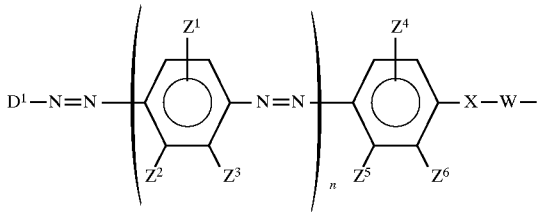

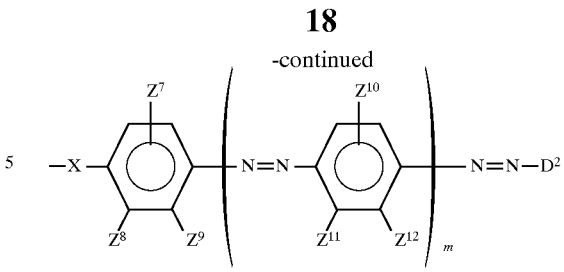

wherein $D^1$ and $D^2$ each represents an optionally substituted phenyl group or an aromatic heterocyclic group; W represents a connecting group comprising a linear polycyclic aromatic group selected from 4,4'-biphenylene, 2,6-naphthylene, 2,6-anthracylene, 2,7-phenanthrylene or 4,4''-p-terphenylene which each may have one or more substituents; X represents a group selected from the group consisting of—OCH$_2$—, —CH$_2$O—, —OOC—, —COO—, —CH$_2$NR—and—NRCH$_2$—, where R represents a hydrogen atom or a methyl group; $Z^1$ to $Z^{12}$ each represents a hydrogen atom, a halogen atom, a methyl group or a methoxy group, or $Z^2$ and $Z^3$, $Z^5$ and $Z^6$, $Z^8$ and $Z^9$ and $Z^{11}$ and $Z^{12}$ are bonded to each other to form an aliphatic ring or an aromatic ring; and m and n each represents a number of 0 to 2.

5. The liquid-crystal composition as claimed in claim 4, which contains the dichroic azo dye in an amount of from 0.05 to 15% by weight based on the amount of the liquid-crystal compound.

6. The liquid-crystal composition as claimed in claim 4, wherein when $D^1$ or $D^2$ is said optionally substituted aromatic heterocyclic group, the aromatic heterocyclic group is a thiazole ring, benzothiazole ring, a thiadiazole ring or a benzoxazole ring.

7. A liquid-crystal element which comprises a liquid-crystal composition sandwiched between two substrates each having an electrode, at least one of said electrode-possessing substrates being transparent, the liquid-crystal composition comprising a liquid-crystal compound and a dichroic azo dye represented by general formula (I):

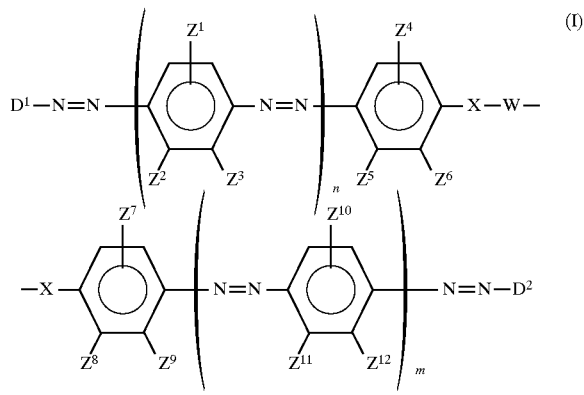

wherein $D^1$ and $D^2$ each represents an optionally substituted phenyl group or an aromatic heterocyclic group; W represents a connecting group comprising a linear polycyclic aromatic group selected from 4,4'-biphenylene, 2,6-naphthylene, 2,6-anthracylene, 2,7-phenanthrylene or 4,4''-p-terphenylene which each may have one or more substituents; X represents a group selected from the group consisting of—OCH$_2$—, —CH$_2$O—, —OOC—, —COO—, —CH$_2$NR—and—NRCH$_2$—, where R represents a hydrogen atom or a methyl group; $Z^1$ to $Z^{12}$ each represents a hydrogen atom, a halogen atom, a methyl group or a methoxy group, or $Z^2$ and $Z^3$, $Z^5$ and $Z^6$, $Z^8$ and $Z^9$ and $Z^{11}$ and $Z^{12}$ are bonded to each other to form an aliphatic ring or an aromatic ring; and m and n each represents a number of 0 to 2.

8. The liquid-crystal element as claimed in claim 7, wherein when $D^1$ or $D^2$ is said optionally substituted aromatic heterocyclic group, the aromatic heterocyclic group is a thiazole ring, benzothiazole ring, a thiadiazole ring or a benzoxazole ring.

* * * * *